Figure 1:
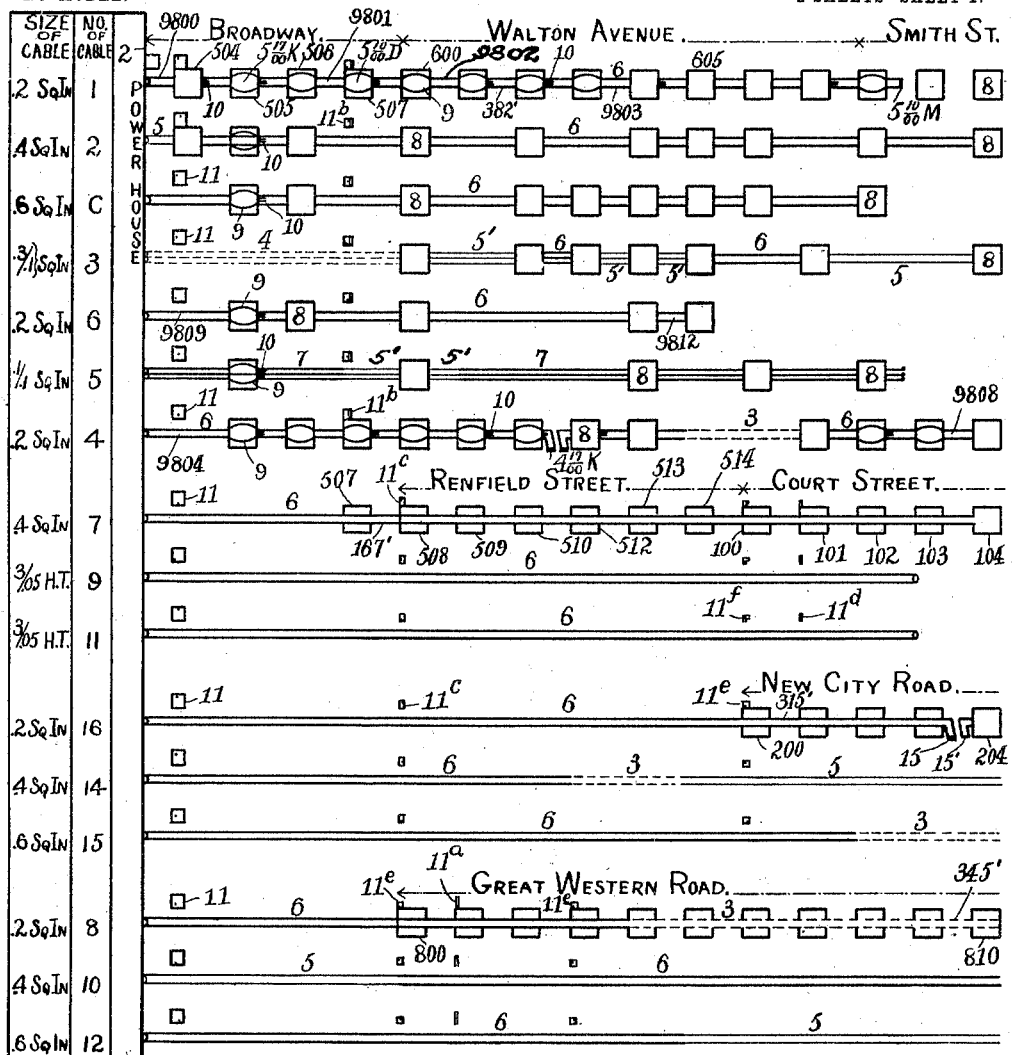

No. 759,020. PATENTED MAY 3, 1904.
W. E. RUNDLE.
UNDERGROUND CABLE SYSTEM CHART.
APPLICATION FILED MAR. 27, 1903.
NO MODEL. 2 SHEETS—SHEET 1.

Witnesses: R. Champion, Chas. D. King
Inventor: William E. Rundle
By his Attorney No. 759,020. PATENTED MAY 3, 1904.
W. E. RUNDLE.
UNDERGROUND CABLE SYSTEM CHART.
APPLICATION FILED MAR. 27, 1903.
NO MODEL. 2 SHEETS—SHEET 2.
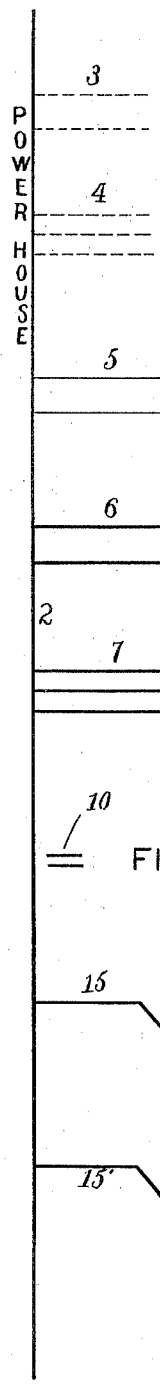
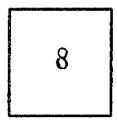
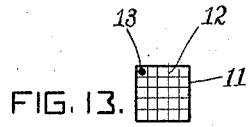
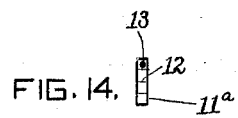
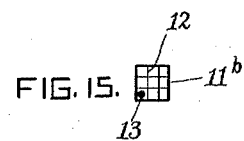
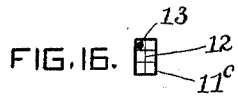
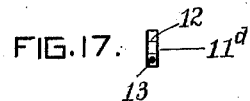
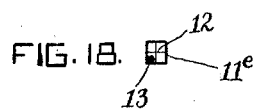
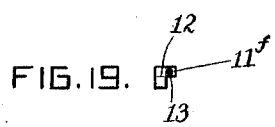
Witnesses
R. Champion
Chas. D. King.
Inventor
William E. Rundle
By his Attorney No. 759,020. Patented May 3, 1904.

UNITED STATES PATENT OFFICE.

WILLIAM E. RUNDLE, OF EAST ORANGE, NEW JERSEY.

UNDERGROUND-CABLE-SYSTEM CHART.

SPECIFICATION forming part of Letters Patent No. 759,020, dated May 3, 1904.

Application filed March 27, 1903. Serial No. 149,911. (No specimens.)

*To all whom it may concern:*

Be it known that I, WILLIAM E. RUNDLE, a citizen of the United States, and a resident of East Orange, in the county of Essex and State of New Jersey, have invented certain new and useful Improvements in Underground-Cable-System Charts, of which the following is a specification.

This invention relates to an underground-cable-system chart; and its principal object is to provide a chart of an underground-cable system containing all the principal points of information necessary to a proper understanding of the organization of such a system.

Heretofore it has been customary to keep the necessary information or records relating to underground-cable systems in such a manner that but a small portion of the system—frequently only a single manhole, with its connections, dimensions, &c.—would be shown on a sheet, and in using such records it is necessary to examine a large number of successive sheets in order to obtain even a fair idea of the positions and connections of the multitude of elements comprised in the system. In my improved chart, however, the complete layout of an entire system is shown, and on this chart, either by symbols or other suitable provisions, all of the principal items of information with respect to the positions, connections, &c., of the elements of an underground-cable system are given in such a manner that the plan of the system as a whole is clearly presented and is easily understood without the labor and fatigue which result from the selection of various items from a large mass of data and the mental assemblage of these items. In this chart some of the principal provisions or symbols employed are those indicating the points at which a cable is drawn into the manholes of the system, the joints made at such manholes, and the particular duct which receives the cable when the conduit is a multiple-duct one, as is usually the case. Other important provisions are those indicating whether a duct contains one or more cables, whether the cable is laid or is on hand but not laid, whether the cable, though not on hand, has been ordered, which cable-sections are drawn from the same reels as the cable of the next preceding sections, respectively, &c.

Figure 2:
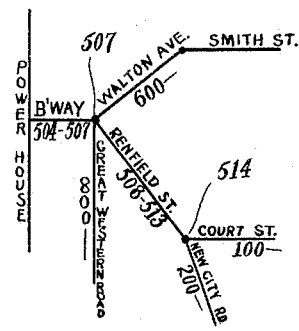

In the drawings accompanying this specification and forming part of the present application, Figure 1 is a chart or diagram of an underground-cable system illustrating graphically the principal elements of such a system and the manner in which those elements are connected and organized. Fig. 2 is a map of the streets or highways containing the underground cable, and Figs. 3 to 19, inclusive, are enlarged details illustrating the various provisions or symbols indicating the different elements and conditions found in the system.

Similar characters designate like parts in all the figures of the drawings.

The chart shown in Fig. 1 illustrates one specific assemblage of symbols, &c., indicating how the elements of one particular system are combined at one stage in the progress of the work thereon, and it represents substantially all of the leading elements and conditions found in an underground-cable system. In this figure each cable of a given cross-section is preferably shown as separated from the other cables of the system in order to avoid the confusion which would result from the use of different graphical provisions or symbols for indicating cables of different sizes. In this chart eighteen different cables are shown, most of which are passed singly through the ducts of suitable conduits, usually of the multiple-duct type, while in a few cases these cables are shown assembled in pairs to indicate that two cables are passed through a single duct, suitable provisions or symbols being used to distinguish between a duct having but one cable therein and a duct containing two cables. The provisions which I prefer to employ for indicating the cable graphically are a pair of parallel lines of considerable length. Different provisions may be used to indicate different conditions with respect to the cable, and in this case heavy and light full lines, either in pairs or in groups of three and corresponding dotted light lines, are used to indicate whether the cable is laid or unlaid, though on hand, or whether it is merely ordered and also whether a duct contains one or two cables. In Figs. 3 to 7, inclusive, the symbols indicating these various conditions of the cable are illustrated in detail. As all of these cables have their beginning at the power-house, the different symbols both in the chart and in the detail views are shown in most cases as reading from the power-house, which is indicated by the line 2, from which line the symbols shown in Figs. 3 to 10, inclusive, are drawn.

In Fig. 3 two light dotted parallel lines indicate a single cable and also show that the cable has been ordered, but not received. Three light dotted parallel lines, as shown in Fig. 4, indicate the same conditions and also show that there are two cables in a single duct instead of one. The two light full parallel lines in Fig. 5 indicate that the cable is on hand, but not laid, while two heavy full parallel lines, as shown in Fig. 6, indicate that the cable is laid. Three heavy full parallel lines, as indicated in Fig. 7, denote two cables drawn into a single duct. These various provisions or symbols are designated, respectively, by 3, 4, 5, 6, and 7, and it will be clear from these symbols that wherever but two parallel lines are shown, whether they be heavy, light, or dotted lines, a single cable is indicated, while when three parallel lines are shown two cables in a single duct are indicated regardless of the particular character of the lines shown, the differences in the characteristics of the lines themselves indicating different conditions with respect to the cable regardless of whether one or two cables are shown.

In Fig. 1 three light parallel lines (indicated by 5') denote two cables which are on hand, but not laid, and are to be drawn into a single duct.

In underground-cable work each cable usually intersects or is drawn into a large number of manholes, and an important element of my chart is the employment of suitable provisions or symbols for indicating manholes and associated elements. Any suitable symbol—such, for example, as the square 8—may indicate a manhole into which a cable is drawn, and the number of manholes through which a cable passes is illustrated separately for each separate single cable or pair of cables. All these manholes may have individual distinguishing marks or numbers—as, for example, the numbers 504 to 507, inclusive, 600 to 605, 508 to 514, 100 to 104, 200 to 204, and 800 to 810—these different series being numbered differently because each series is located on a different street or highway from all the others. The continuations of the different series are indicated in several instances without special distinguishing numbers.

Associated with each manhole may be another symbol or symbols for indicating other elements of the system. The principal symbol of this character is that shown at 9, which represents the joint at a manhole—that is to say, the connection of cable ends in a manhole. Another provision shown is a pair of short parallel lines 10, which symbol indicates that the cable in its section is taken from the same reel as that used in the next preceding section. For the purpose of identifying the reels from which the different sections of the cable are drawn provisions such as identifying marks or figures may be used. These numbers are placed on the respective sections of the cable at the beginning of each section, as shown at 9800, 9801, 9802, 9803, 9804, &c.

Other provisions may also be used to indicate the time when and the person by whom each particular portion of the work is completed, numbers being used to indicate the month and day of the month and the last two figures of a year to indicate a year, while a letter—for example, K, D, or M—indicates the foreman or other person who makes a joint, superintends drawing in of the cable, &c. The length of cable between manholes may, if desired, be indicated by placing on each section of cable a number representing the exact length of such portion of cable, as indicated, for example, at 382', 167', 315', and 345'.

One of the most important provisions, however, that I have employed in this chart is the means for indicating the type of multiple-duct conduit into which each cable is drawn and the particular duct in which such cable is located. In Figs. 13 to 19, inclusive, I have shown graphically seven different provisions indicating seven different species of conduits of the same general type—that is to say, conduits having ducts of like cross-section. The full-size conduit indicated in Fig. 13 has twenty-five cable-ducts disposed in five rows of five ducts each, while the conduits indicated in the other views are of similar construction and have fewer ducts. All of these provisions or symbols, however, have one characteristic in common—that is to say, they are all geometrical figures divisible by cross-section lines 12 into spaces representing ducts of equal size. The different symbols indicating the different species of of multiple-duct conduits are represented, respectively, by 11 $11^a$ $11^b$ $11^c$ $11^d$ $11^e$ $11^f$. Each of these symbols is placed adjacent to a corresponding portion of a cable and when so placed indicates that the conduit through which that portion of the cable passes has the specific cross-section illustrated. In order to locate graphically the position of each cable in the duct through which it passes, it is also necessary to employ some means for distinguishinging the particular duct containing such cable, and this may be accomplished by using as a symbol a dot located in the particular duct through which the cable is drawn. This is clearly illustrated in Figs. 13 to 19, inclusive. In Fig. 13, for instance, the dot 13 shows that the cable is drawn through the left-hand duct in the top row, it being understood, as before stated, that each of these symbols is read as looking away from the power-house toward the end of the line. This chart also illustrates the number of cables running from the power-house and the first manhole at which the cables branch and also the number of cables running from this manhole 507, it being only necessary to count the number of dots in the duct-symbols of each group to determine the number of cables on each line, most of the branches having three cables each.

Additional provisions may be used to indicate such other elements or facts as may be of importance, symbols, such as those shown at 15 and 15' in Figs. 9 and 10, being used to indicate, respectively, a terminal having the date of completion of the work displayed thereon and a terminal with no date thereon.

At the edge of the body of the chart, adjacent to the power-house, there will preferably be provisions, such as a table, for indicating opposite each cable the characteristic mark or number of that cable and the size or cross-section of the cable, these provisions being displayed in the columns designated, respectively, by 16 and 17.

While I have described my invention with relation to underground-cable systems, I do not limit myself thereto, as the invention may be used for systems of conductors placed overhead on cross-arms or in tunnels on racks, as will be readily understood.

What I claim is—

1. A chart for a system of electrical conductors said chart having thereon symbols running in one general direction for indicating a series of conductors which run in one general direction, in combination with symbols indicating local facts relating to said conductors the general direction of corresponding symbols indicating local facts relating to different conductors being on a line transverse to the general direction of said first symbols.

2. A chart for a system of electrical conductors said chart having thereon parallel lines indicating a series of conductors which run in one general direction, in combination with a series of corresponding local symbols associated respectively with said lines said series of symbols being transverse to said lines.

3. A chart for a system of electrical conductors said chart having thereon parallel lines indicating a series of conductors which run in one general direction, in combination with a plurality of series of local symbols each of which series is transverse to said lines, the symbols of different series indicating different local facts and the symbols of the same series to being located in corresponding positions on said lines and indicating corresponding local facts.

4. A chart for a system of electrical conductors, said chart consisting of a group of symbols placed in lines perpendicular to one another, the symbols in lines reading in one direction indicating different local facts relating to one conductor, and the symbols in each line reading in the other direction indicating corresponding local facts relating to a plurality of said conductors.

5. A chart for a system of electrical conductors, said chart consisting of a group of symbols placed in lines perpendicular to one another, the symbols in lines reading in one direction indicating different local facts relating to one conductor, and the symbols in each line reading in the other direction indicating corresponding local facts relating to a plurality of said conductors the symbols in one of said last-named lines indicating the relative positions of the conductors with respect to their supports at a given point.

6. An underground-cable-system chart consisting of a group of symbols placed in lines perpendicular to one another, the symbols in each line reading in one direction indicating the types of conduit-section used at different points in the cable and the duct through which the cable passes at each respective point, and the symbols in each line reading in the other direction indicating the respective ducts in a given type of conduit-section through which the different cables pass at a given point.

7. An underground-cable-system chart consisting of a group of symbols placed in lines perpendicular to one another, the symbols in each line reading in one direction indicating a cable, the types of conduit-section used at different points in said cable, and the duct through which the cable passes at each respective point, and the symbols in each line reading in the other direction indicating the respective ducts in a given type of conduit-section through which the different cables pass at a given point.

Signed at New York, in the county of New York and State of New York, this 25th day of March, A. D. 1903.

WILLIAM E. RUNDLE.

Witnesses:
C. S. CHAMPION,
R. CHAMPION.